United States Patent Office 2,895,197
Patented July 21, 1959

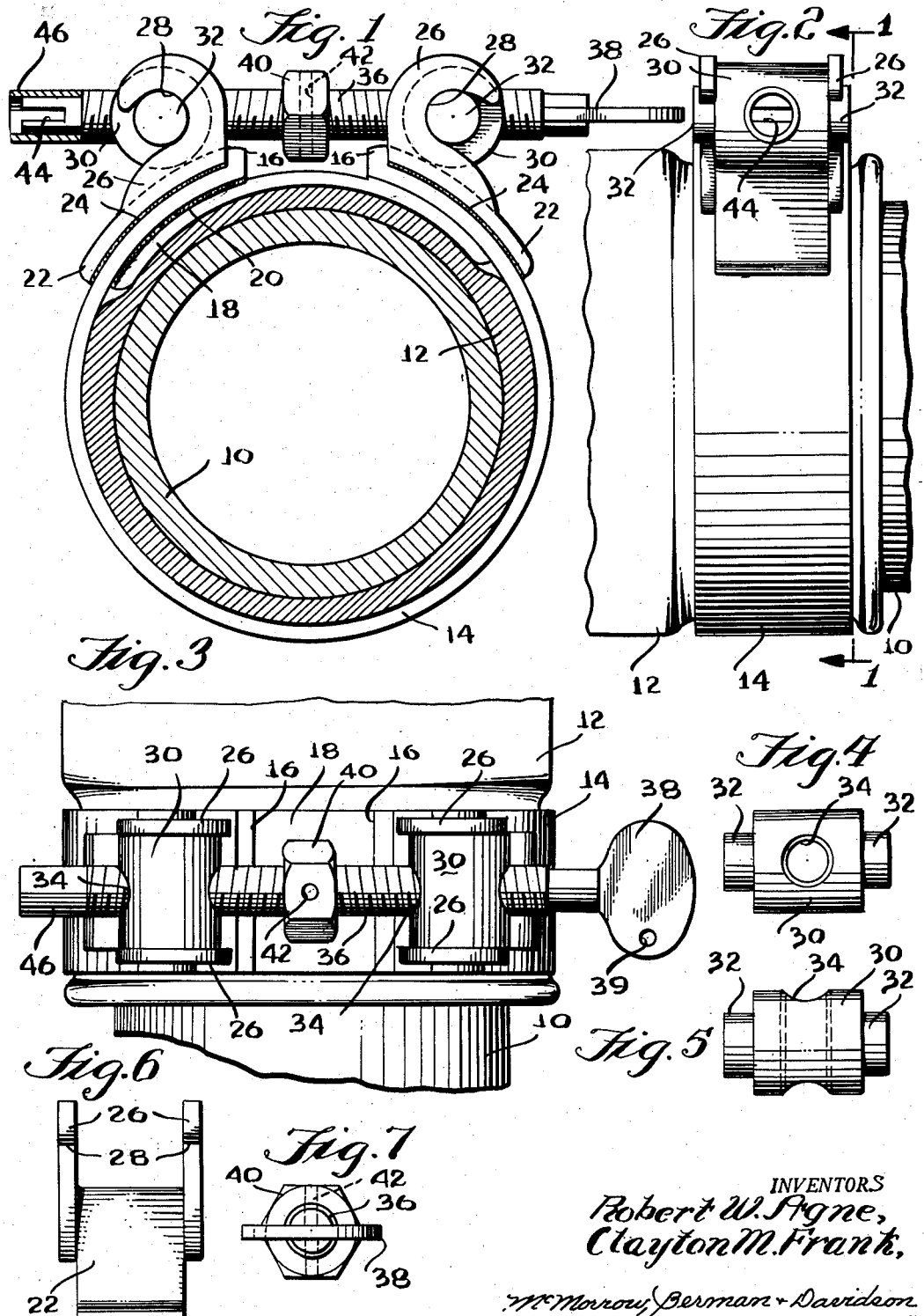

2,895,197

HOSE CLAMP

Robert W. Agne and Clayton M. Frank, Mobile, Ala.

Application September 27, 1955, Serial No. 536,823

1 Claim. (Cl. 24—279)

This invention relates to hose clamps, and more particularly has reference to a hose clamp adapted for universal installation on any of various types of hoses, to clamp the same about a communicating hose section. Summarized briefly, the invention comprises a hose-encircling member having overlapping ends, with opposed, hook-shaped, outwardly turned brackets being fixedly secured to the end portions of said member. Engaged in the hook-like brackets are pins disposed longitudinally of the associated hose section and spaced transversely of the hose section in parallel relation, said pins having diametrically extending bores and said bores having threads of opposite hand. Threadedly engaged in the respective bores is a screw the end portions of which have threads of opposite hand, rotation of said screw being adapted to shift the brackets toward and away from one another according to whether the hose is to be clamped or unclamped. Means is provided on the screw for receiving a lock wire at locations spaced longitudinally thereof, to hold the screw against rotation from selected positions to which it is turned, thus to assure permanent retention of the clamping action of said hose-encircling member.

The main object of the present invention is to provide a hose clamp characterized by a true take-up, that is, by a uniform radial contraction of the hose-encircling band, in turn resulting in a uniform application of clamping pressure through the full circumference of the device.

Another object of importance is to provide a device of the type stated in which the clamping thereof to the hose will be effected with far greater speed than is true of hose clamps in general use today, this being true of the commonly used hose clamps that apply a clamping action by radial contraction, by a tangentially extending machine screw, a tangential worm, or by a ratchet action.

A further object is to provide a hose clamp which will be characterized by its ease of assembly during manufacture.

Another object of importance is to so design the hose clamp as to permit it to be applied to or removed from a hose without necessity of disconnecting the hose from an adjacent hose section.

Another object of importance is to provide a clamp of the type referred to which will be adapted for use on any of various types of hoses, such as ordinary hoses through which liquid flows, aircraft hoses, etc.

Other objects will appear from the following description, the claim appended thereto, and from the annexed drawing, in which like reference characters designate like parts throughout the several views, and wherein:

Figure 1 is a transverse sectional view through a hose equipped with a clamp formed according to the present invention;

Figure 2 is a fragmentary side elevational view of the hose, showing the clamp in side elevation;

Figure 3 is a top plan view of the clamp and of the associated portion of the hose;

Figure 4 is an elevational view of one of the screw receiving nuts per se;

Figure 5 is an elevational view of a nut shown in Figure 4, seen at a location angularly spaced 90 degrees from that at which the nut is viewed in Figure 4;

Figure 6 is an elevational view of one of the brackets; and

Figure 7 is an end elevational view of the clamping bolt, per se.

Designated at 10 is a first hose section extending into a second hose section 12 which is to be clamped to the first section. The device constituting the present invention includes an elongated clamping band 14, having spaced ends formed with upwardly turned lips 16. Welded, riveted, or otherwise fixedly secured to the inner surface of one end portion of the clamping band is one end of an arcuate shoe 18, the other end of which is free and underlies the opposite end portion of the clamping band. The fixed connection of the shoe to the first named end portion has been designated at 20, and at 22 there are designated brackets welded, at 24 to the outer surfaces of the respective end portions of the band.

The brackets 22 include upwardly projecting hook elements 26 spaced transversely of each bracket, the recessed portions of the hook elements being faced outwardly, and defining bearing recesses 28. Cylindrical nuts 30, having trunnions 32 (Figure 4) are carried by the respective brackets, the trunnions being disposed in the recesses of the brackets. One of the brackets, shown at the left in Figure 1, has the free ends of the hook portions thereof turned downwardly, so as to permanently retain the associated nut 30 therein.

Formed in the respective nuts are diametrically extending, through bores or openings 34, said bores being threaded and the threads of one of the nuts being of opposite hand as compared to the threads of the other nut. A clamping bolt 36 has end portions of opposite hand, engageable in the respective bores 34, and at one end, the clamping bolt has a reduced axial extension slotted to receive a wing 38 formed adjacent one side thereof with a small aperture 39 adapted to receive a lock wire, not shown. The wing is welded or otherwise fixedly engaged in the associated slot.

Intermediate its ends, the bolt is integrally or otherwise rigidly provided with a wrench-receiving enlargement 40, having a diametrically extending opening 42 adapted to receive said lock wire.

At its other end, the clamping bolt has a reduced axial extension formed with a slot 44 providing a kerf for a screw driver bit, not shown. Fitted about the slot extension is a sleeve 46, the purpose of which is to prevent the screw driver bit from slipping out of slot 44 when the bolt is being rotated by the screw driver.

In assembly of the device during manufacture, the nut 30 shown at the left in Figure 1 is first engaged in its associated bracket, and then said bracket is partially closed so as to retain the nut.

At the time of installation the other nut, shown at the right in Figure 1, is disposed in its associated bracket. Then, the installation of the clamp is completed by turning the clamping bolt, which will previously have been threaded into the first named nut, in a direction to engage the same in the bore of the right hand nut shown in Figure 1. The rotation of the bolt can be accomplished with a screw driver in the manner previously described. Alternatively, a wrench can be used, applied to the formation 40. Then again, the bolt could be rotated manually by means of the wing 38.

This assembles the device about the hose, and by rotation of the bolt in a direction to draw the brackets together, the clamping band is contracted radially about the associated hose section 12. Following installation, a lock wire can be extended through the apertures 39, 42, to hold the several components in their hose clamping relationship.

It may be noted from Figure 1 that the formation or enlargement 40 is disposed midway between the brackets, and extends downwardly in Figure 1 into the path along which lips 16 would move toward each other when the clamping band is being contracted about a hose. By reason of this arrangement, and due to the fact that the device includes a connecting bolt the end portions of which are provided with threads of opposite hand, the lips would be moved toward each other simultaneously, and to an equal extent. In other words, the lips would approach opposite faces of the enlargement 40 simultaneously, and at the same rate. This means that ultimately, the lips would simultaneously engage the enlargement 40. Enlargement 40 thus can appropriately be considered as a limit stop, which will limit the movement of the lips 16 toward each other beyond a predetermined extent. This arrangement is desirable, in that it provides a positive limit on radial contraction of the clamping band, to insure that it will not damage a hose falling within a predetermined range of sizes to which the particular clamping band is applicable, following manufacturer's directions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the prrinciples, it being considered that the invention comprehends any minor change in construction that may be permitted within the scope of the appended claim.

What is claimed is:

A hose clamp comprising: a clamping band having spaced ends, said band curving in a generally circular path so as to be contractable about a hose; spaced lips formed upon the respective ends and projecting outwardly from said path; brackets secured to the band in abutting relation to the respective lips exteriorly of the space therebetween; nuts engaged with the respective brackets against rotation relative thereto; a bolt having end portions respectively formed with threads of opposite hand, said end portions being threaddedly engaged with said nuts, said bolt including a wrench-receiving enlargement located midway between the lips for rotating the bolt, said enlargement extending into the space between the lips in position to constitute a limit stop the opposite sides of which are engageable simultaneously by the lips following contraction of the band about a hose to a predetermined extend, in response to movement of the nuts toward each other a predetermined distance on rotation of the bolt in one direction.

References Cited in the file of this patent

UNITED STATES PATENTS

| | | |
|---|---|---|
| 96,843 | Smith | Nov. 16, 1869 |
| 407,559 | Wells | July 23, 1889 |
| 727,651 | Loetscher | May 12, 1903 |
| 759,255 | Ferguson et al. | May 10, 1904 |
| 2,283,179 | Buckingham | May 19, 1942 |
| 2,339,759 | Bidwell | Jan. 25, 1944 |
| 2,395,273 | Hill et al. | Feb. 19, 1946 |
| 2,522,494 | Baldo | Sept. 19, 1950 |
| 2,580,396 | Bluth | Jan. 1, 1952 |

FOREIGN PATENTS

| | | |
|---|---|---|
| 15,926 | Norway | Apr. 10, 1906 |
| 25,855 | Great Britain | 1908 |
| 79,014 | Norway | Jan. 27, 1950 |
| 104,484 | Great Britain | Mar. 8, 1917 |
| 705,247 | Great Britain | Mar. 10, 1954 |